United States Patent [19]

Mori et al.

[11] 4,339,103
[45] Jul. 13, 1982

[54] DEVICE FOR ADJUSTING INCLINED ANGLE OF SEATING SURFACE OF SEAT CUSHION

[75] Inventors: Mamoru Mori, Okazaki; Takami Terada, Toyota, both of Japan

[73] Assignees: Toyota Jidosha Kogyo Kabushiki Kaisha; Aisin Seiki Kabushiki Kaisha, both of Aichi, Japan

[21] Appl. No.: 156,627

[22] Filed: Jun. 5, 1980

[30] Foreign Application Priority Data

Jul. 26, 1979 [JP] Japan .......................... 54/103418[U]

[51] Int. Cl.³ ............................................. A47C 1/025
[52] U.S. Cl. ................................... 248/397; 297/327; 297/328
[58] Field of Search ................ 248/397, 371; 297/327, 297/326, 328; 74/89.19, 89.18, 29

[56] References Cited

U.S. PATENT DOCUMENTS

| | | | |
|---|---|---|---|
| 132,255 | 10/1972 | Coates | 297/328 |
| 290,841 | 12/1883 | Bohsert | 297/328 |
| 1,797,336 | 3/1931 | Field | 74/89.19 |
| 3,198,575 | 8/1965 | Hawkins | 297/328 |
| 3,235,304 | 2/1966 | Glass | 297/327 X |
| 3,335,995 | 8/1967 | Pickles | 74/89.19 X |
| 3,695,570 | 10/1972 | Ishida | 248/397 |

FOREIGN PATENT DOCUMENTS

| | | | |
|---|---|---|---|
| 2141116 | 3/1973 | Fed. Rep. of Germany | 297/328 |
| 2051958 | 8/1979 | Fed. Rep. of Germany | 248/397 |
| 2842770 | 4/1980 | Fed. Rep. of Germany | 248/371 |
| 691602 | 7/1930 | France | 297/328 |
| 775067 | 12/1934 | France | 297/327 |

*Primary Examiner*—James T. McCall
*Attorney, Agent, or Firm*—Stevens, Davis, Miller & Mosher

[57] ABSTRACT

A device for adjusting the inclined angle of the seating surface of the seat cushion of an automotive seat essentially mounted in a vehicle. A pair of seat slide adjusting units are fixed to seat slide upper rails arranged on a floor surface and are disposed at both sides of a seat cushion frame. A sector gear plate is so secured to a bracket fixedly secured to the seat slide adjusting unit as to be elevationally rocked at its base around a fulcrum. Another bracket is fixedly secured to the seat sliding adjusting unit. A pinion gear rotated by a handle knob is journaled at the another bracket at a fulcrum. The pinion gear is coupled through a non-reversing unit with the handle knob in a manner that the gear may be freely rotated by the operation of the knob but may not be rotated by the rotating load applied from the pinion gear side. The pinion gear is engaged in mesh with the teeth of the gear plate. A link is pivotally secured to a pin secured at the intermediate portion between the base and the teeth of the gear plate at the lower portion and is also pivotally secured at the axial hole of the upper portion thereof to the seat cushion frame. A bracket is also fixedly secured at the same situation as the previous bracket to the other seat slide adjusting unit. Thus, when the knob is manipulated, the seat cushion can be tilted up or down in response to the sitting person's physique or preference to his most comfortable attitude.

5 Claims, 3 Drawing Figures

DEVICE FOR ADJUSTING INCLINED ANGLE OF SEATING SURFACE OF SEAT CUSHION

BACKGROUND OF THE INVENTION

This invention relates to an automotive seat and, more particularly, to an improvement of a device for adjusting the inclined angle of the seating surface of the seat cushion of an automotive seat essentially mounted in a vehicle.

There have been proposed a variety of devices for adjusting the inclined angle of the seating surface of the seat cushion of an automotive seat in response to the sitting person's physique or preference to thereby prevent his fatigue so as to retain his comfortable seating attitude for a long time. All these devices can adjust the inclined angle of the seat cushion in several steps in limited range, and the sitting person can merely select his approximate desired inclined angle from the several steps. Accordingly, all the sitting persons can not always select his most comfortable seating attitude nor obtain sufficient effect on the seat cushion.

SUMMARY OF THE INVENTION

Accordingly, a primary object of the present invention is to provide a device for adjusting the inclined angle of the seating surface of the seat cushion of an automotive seat which can eliminate the aforementioned disadvantages of the conventional device of this type and can steplessly arbitrarily select or adjust the inclined angle of the seating surface of the seat cushion.

Another object of the present invention is to provide a device for adjusting the inclined angle of the seating surface of the seat cushion of an automotive seat which is simple in its construction, employs less number of parts in light weight, and can be produced inexpensively.

Still another object of the present invention is to provide a device for adjusting the inclined angle of the seating surface of the seat cushion of an automotive seat in which all the sitting persons can each select his most comfortable seating attitude in response to his physique or preference.

BRIEF DESCRIPTION OF THE DRAWINGS

The above and other related objects and features of the invention will be apparent from a reading of the following description of the disclosure found in the accompanying drawings and the novelty thereof printed out in the appended claims.

DETAILED DESCRIPTION OF THE PREFERRED EMBODIMENTS

Figure 1:
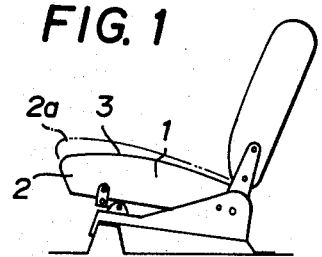
FIG. 1 is a schematic side elevational view of the automotive seat applied with the device for adjusting the inclined angle of the seating surface of the seat cushion constructed according to the present invention.

Referring now to the drawings, particularly to FIG. 1 showing the general side elevational configuration of the automotive seat employing the device for adjusting the inclined surface of the seating surface of the seat of the invention, wherein like reference numerals designate the same parts in the following views, the inclined angle of the seating surface 3 of a seat cushion 1 with respect to the floor surface can be arbitrarily adjusted by tilting up or down the seat cushion 1 to cause the front edge 2 of the seat cushion 1 to move from the position designated by a solid line to the position designated by a dotted broken line 2a or vice versa.

Figure 2:
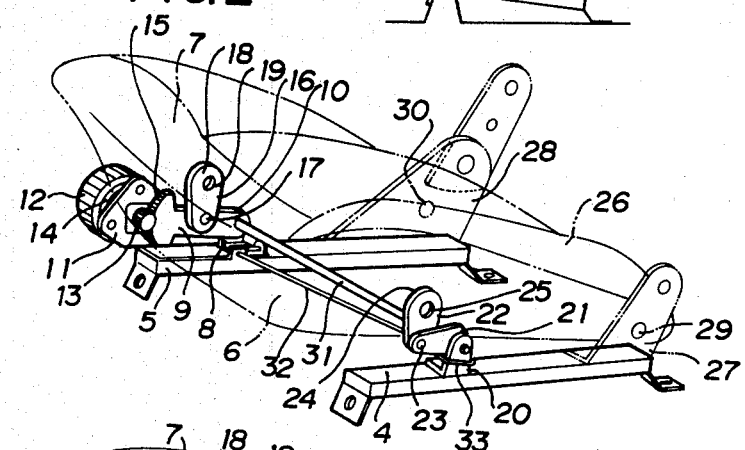
FIG. 2 is a perspective view of the device for adjusting the inclined angle of the seating surface of the seat cushion of one preferred embodiment of the present invention.

Reference is made to FIG. 2 showing one preferred embodiment of the device for adjusting the inclined angle of the seating surface of the seat cushion 1. A pair of seat slide adjusting units 4 and 5 are fixed to seat slide upper rails arranged on a floor surface (not shown), and are disposed at both sides of a seat cushion frame 6 to be mounted with the seat cushion frame 6 thereon.

A bracket 8 is fixedly secured to the seat slide adjusting unit 5 at the position corresponding to the front side position 7 of the seat cushion frame 6. A sector gear plate 9 is so secured to the bracket 8 as to be elevationally rocked at its base 10 around a fulcrum as will be described in greater detail.

Another bracket 11 is fixedly secured to the seat slide adjusting unit 5. A pinion gear 13 to be rotated by a handle knob 12 is journaled at the bracket 11 at a fulcrum. The pinion gear 13 is coupled through a non-reversing unit 14 such as a spring coupler with the handle knob 12 in such a manner that the gear 13 may be freely rotated by the manipulation of the knob 12 but may not be rotated by the rotating load applied from the pinion gear 13 side and accordingly the gear plate 9 side.

The pinion gear 13 is engaged in mesh with the teeth 15 of the gear plate 9, and the latter is elevationally rocked up or down upon normal or reverse rotation of the pinion gear 13 as driven via the knob 12.

A link 16 is pivotally secured to a pin 17 secured at the intermediate portion between the base 10 of the gear plate 9 and the teeth 15 of the gear plate 9 at the lower portion thereof and is also pivotally secured at the axial hole 19 of the upper portion 18 thereof to the seat cushion frame 6.

A bracket 20 is fixedly secured at the same situation as the bracket 8 to the other seat slide adjusting unit 4. Another bracket 21 is so secured to the bracket 20 as to be elevationally rocked at a fulcrum. A link 22 is pivotally secured to a pin 23 at the same situation as the link 16 of the gear plate 9 at the lower portion thereof and is also pivotally secured at the axial hole 25 of the upper portion 24 thereof to the seat cushion frame 6. Since the link 22 is arranged in the same situation as the link 16, the relationship between the fulcrum of the bracket 20 and the pin 23 at the bracket 21 is in the same situation as the relationship between the fulcrum of the bracket 8 and the pin 17 at the base 10 of the gear plate 9. The rear portion 26 of the seat cushion frame 6 is pivotally secured via shafts 29 and 30 to brackets 27 and 28, respectively fixedly secured to the seat slide adjusting units 4 and 5, respectively.

In this exemplified example, a torque rod 31 is fixedly secured at one end to the gear plate 9 and at the other to the bracket 21 in a manner to be rotatably journaled at one end thereof at the bracket 8 for supporting at a fulcrum the base 10 of the gear plate 9 and at the other end thereof at the bracket 20 for supporting at a fulcrum the bracket 21. Thus, the bracket 21 is interlocked through the torque rod 31 to the gear plate 9.

Figure 3:
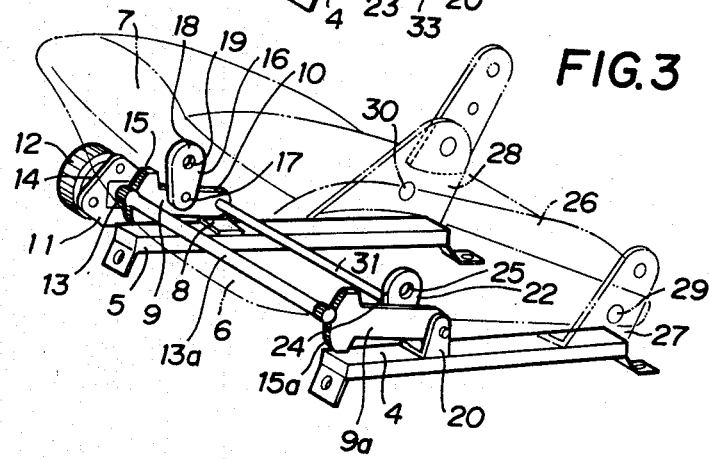
FIG. 3 is a view similar to FIG. 1 but showing another preferred embodiment of the device for adjusting the inclined angle of the seating surface of the seat cushion of the invention.

Referring now to FIG. 3 showing another preferred embodiment of the device for adjusting the inclined angle of the seating surface of the seat cushion of the invention, this modified device comprises instead of the bracket 21 in the previous embodiment another gear plate 9a constructed in the same manner as the gear plate 9, a second pinion gear 13a constructed and engaged in mesh with the gear plate 9a in the same manner as the pinion gear 13 at the teeth 15a thereof instead of the bracket 21, and a torque rod 31 fixedly secured at one end thereof to the fulcrum of the pinion gear 13 and at the other end thereof to the fulcrum of the pinion gear 13a.

Referring back to FIG. 2, a torsion spring 32 is fixedly secured at one end thereof to the bracket 8, and is extended at the other end thereof to the bracket 20 and surrounded at the end 33 thereof around the bracket 20 to then make contact with the lower surface of the bracket 21 to thereby impart its elastic force for always rocking the bracket 21 upwardly, to the bracket 21. This torsion spring 32 applies force against the downward rocking force acting the gear plate 9 and the bracket 21 through the seat cushion frame 6 at sitting person seating time, to the gear plate 9 and the bracket 21.

In operation of the device for adjusting the inclined angle of the seating surface 3 of the seat cushion 1 as constructed above, when the inclined angle of the seating surface 3 is obtained as desired, the rotation of the knob 12 is, as the handle knob 12 is rotated normally or reversely, transmitted through the pinion gear 31 to the teeth 15 of the gear plate 9 to cause the gear plate 9 to rock upwardly or downwardly in the amount corresponding to the rotating angle of the pinion gear 13 to thus allow the seat cushion 1 to be tilted up or down and to thereby raise or lower the front edge 2 of the seat cushion 1 so as to adjust the inclined angle of the seating surface 13 of the seat cushion 1 as desired in a manner that the adjusting range is steplessly set within the number of teeth 15 of the gear plate 9.

It is noted that even if the downward pressure is applied to the seat cushion frame 6 upon sitting of the sitting person on the seat cushion 1 to thereby downwardly rock the gear plate 9 and the bracket 21, the non-reversing unit 14 such as the spring coupler interposed between the handle knob 12 and the pinion gear 13 prevents the seating surface 3 of the seat cushion 1 from lowering to thus always retain the seating surface 3 as selected and adjusted. It will be appreciated that when the inclined angle of the seating surface of the seat cushion 1 is desired to decrease, the handle knob 12 may be reversely rotated.

It should be understood from the foregoing description that since the device for adjusting the inclined angle of the seating surface of the seat cushion is thus constructed and operated according to the present invention to adjust the inclined angle of the seating surface by rocking the gear plate engaging in mesh can be steplessly adjusted as desired in response to the sitting person's physique or preference to his most comfortable attitude. It should also be appreciated that since the device for adjusting the inclined angle of the seating surface is constructed only with the pinion gear, gear plate, brackets and links according to this invention, it is relatively simple in construction with less number of parts in light weight and accordingly produced inexpensively.

What is claimed is:

1. A device for adjusting the inclined angle of the seating surface of the seat cushion of an automotive seat having a pair of seat slide adjusting units disposed at both sides and secured to seat slide upper rails, said device comprising:
    a sector gear plate so journaled at the rear portion thereof at a fulcrum at the position corresponding to the front side position of the seat cushion frame of the one seat slide adjusting unit and including teeth formed at the front face thereof,
    a handle mounted through a first bracket at the seat slide adjusting unit;
    a pinion gear with a non-reversing unit to be rotated by said handle and engaging in mesh with the teeth of said gear plate to allow said gear plate to elevationally rock upon rotation of said pinion gear,
    a first link pivotally secured at an intermediate portion between the rear portion and the front teeth of said gear plate and pivotally secured at the upper portion thereof to the seat cushion frame,
    a second bracket so journaled at the other seat slide adjusting unit as to rock in substantially the same manner as said gear plate,
    a second link pivotally secured to said second bracket in substantially the same orientation as said first link at the lower portion thereof and pivotally secured at the upper portion thereof to the seat cushion frame, and
    means for pivotally securing the seat cushion frame at the rear end thereof to both the seat slide adjusting units.

2. A device for adjusting the inclined angle of the seating surface of the seat cushion of an automotive seat having a pair of seat slide adjusting units disposed at both sides and secured to seat slide upper rails, said device comprising;
    a pair of sector gear plates so journaled at the rear portions thereof at fulcrums at the positions corresponding to the front side positions of the seat cushion frame of both the seat slide adjusting units and including respectively teeth formed at the front faces thereof;
    a handle mounted through a first bracket at the seat slide adjusting unit;
    a pair of pinion gears with non-reversing units to be rotated by said handle and engaging in mesh with the teeth of said respective gear plates to allow said respective gear plates to elevationally rock upon rotation of said respective pinion gears,
    first and second links pivotally secured at intermediate portions between the rear portion and the front teeth of said respective gear plates and pivotally secured at the upper portions thereof to the seat cushion frame, and
    means for pivotally securing the seat cushion frame at the rear end thereof to both the seat slide adjusting units.

3. A device for adjusting the inclined angle of the seating surface of the seat cushion of an automotive seat according to claim 1, further comprising a fulcrum shaft rotatably supported by the bracket secured at both sides of the seat slide adjusting units.

4. A device according to claim 1, wherein said seat cushion frame is pivotally secured at the rear portion thereof to the bracket fixedly secured to the seat slide adjusting units.

5. A device according to claim 3, wherein a torsion spring is extended from the one bracket to the other bracket, and is surrounded at the end thereof around the other bracket to make contact with the lower surface of said second bracket to thereby impart an upward rocking elastic force to said second bracket.

* * * * *